J. W. JAGOE.
CONNECTING ROD BEARING.
APPLICATION FILED FEB. 25, 1920.
1,367,977.
Patented Feb. 8, 1921.
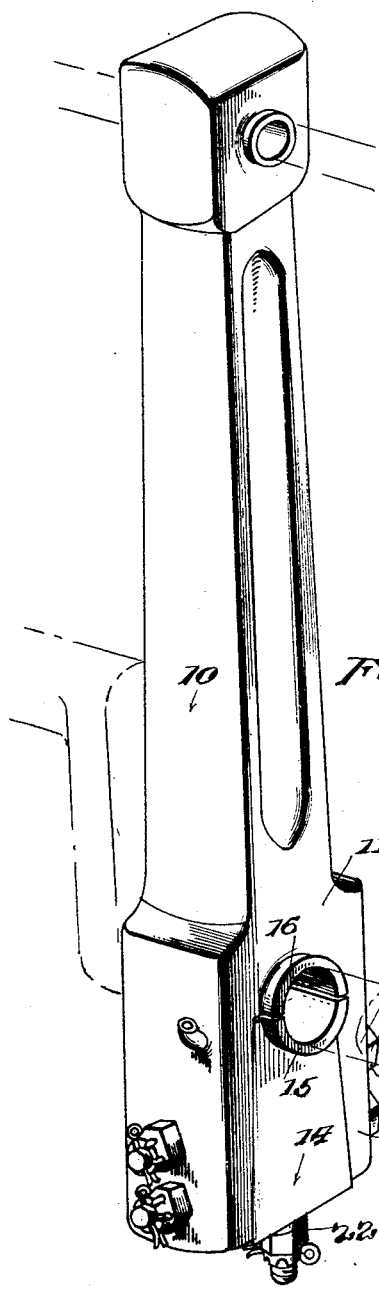
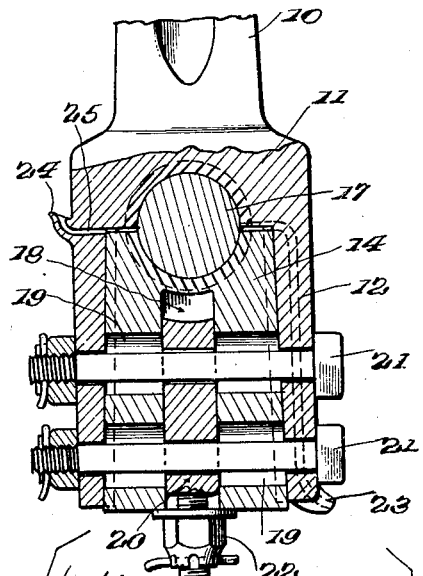
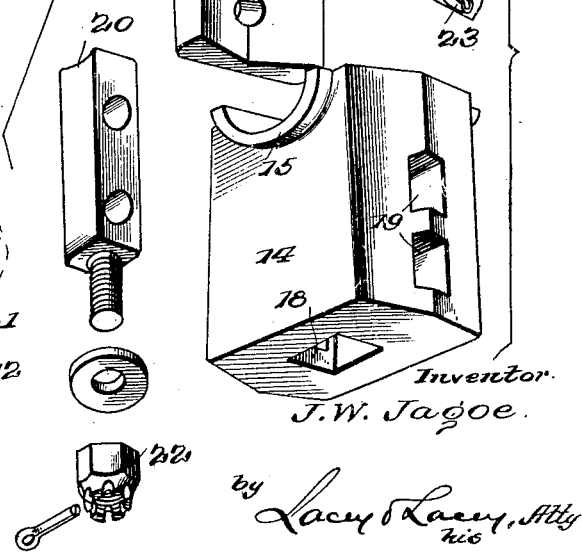
Inventor
J. W. Jagoe
by Lacy & Lacy, Atty's

UNITED STATES PATENT OFFICE.

JOHN W. JAGOE, OF SOUTH ST. PAUL, MINNESOTA.

CONNECTING-ROD BEARING.

1,367,977.  Specification of Letters Patent.  Patented Feb. 8, 1921.

Application filed February 25, 1920. Serial No. 361,123.

*To all whom it may concern:*

Be it known that I, JOHN W. JAGOE, citizen of the United States, residing at South St. Paul, in the county of Dakota and State of Minnesota, have invented certain new and useful Improvements in Connecting-Rod Bearings, of which the following is a specification.

This invention relates to an improved bearing for the connecting rods of internal combustion engines and has as one of its principal objects to provide a bearing wherein wear of the bushings may be readily taken up.

The invention has as a further object to provide a bearing which will eliminate the use of shims as is now commonly practised, and wherein means will be provided for adjustably tightening the bearing with entire efficiency.

A further object of the invention is to provide a bearing wherein the adjustable bearing block employed will be locked within the bearing box so that even though the nut of the adjusting stud for said block becomes loosened, the block cannot, nevertheless, become displaced.

And the invention has as a still further object to provide a bearing of such nature that it may be readily embodied in the structure of the connecting rods of substantially any conventional type of internal combustion engine.

Other and incidental objects will appear hereinafter.

In the drawings:

Figure 1 is a perspective view showing a connecting rod embodying my improved bearing.

Fig. 2 is a framgntary sectional view taken through the bearing, and

Fig. 3 is a detail perspective view showing the bearing disassembled.

As previously intimated, the bearing of the present invention is particularly designed for use in connection with the connecting rods of internal combustion engines and I have accordingly, in the drawings, so shown the bearing. However, I do not wish to be limited in this regard as the bearing will prove entirely efficient wherever found applicable. Referring to the drawings, a connecting rod is indicated at 10. At its lower end this rod is formed with a box 11 having spaced arms 12. The inner side walls of said arms converge somewhat toward the inner ends of the arms and, as will be best observed upon reference to Fig. 3, said walls are each formed with a pair of oppositely beveled faces 13 sloping toward the side edges of the arms. Slidably fitting between the arms is a bearing block 14. This block is substantially wedge-shaped, being tapered toward its inner end, so as to be snugly received between the arms and at its side edges is formed with pairs of oppositely beveled faces sloping toward the side faces of the block and adapted to mate with the pairs of faces 13 of the arms. The beveled faces of the block will thus coact with the beveled faces of the arms for sustaining the block against lateral movement between the arms. At its inner end, the block preferably carries a substantially semi-cylindrical bushing 15 and mounted upon the box to mate with this bushing is a similar bushing 16. As particularly shown in Fig. 2 of the drawings, these bushings are designed to receive a crank pin conventionally illustrated at 17.

Formed in the bearing block 14 centrally thereof is a vertical recess 18 opening through the lower end of the block and intersecting this recess are spaced transverse openings 19 through the block, these latter openings being, as particularly shown in Figs. 2 and 3, flattened somewhat and thus elongated vertically of the block. Freely fitting in the recess 18 is a vertical stud 20 and engaging through the arms 12 of the box to be freely received within the openings 19 are transverse bolts 21 which, as particularly shown in Fig. 2, engage through the stud. The stud is thus rigidly connected with the arms and supported against movement with respect to the bearing block. At its lower end the stud is provided with a reduced extension and threaded upon said extension is a nut 22, a suitable washer being preferably employed between the nut and the lower end of the bearing block. Thus, as will now be appreciated, as the bushings 15 and 16 wear away, the nut 22 may be turned for adjustably advancing the bearing block between the arms of the box for taking up such wear. The bearing may accordingly, with a minimum of difficulty, be maintained tight, it being contemplated, of course, that when the bushings 15 and 16 have become worn out, said bushings shall be renewed. In this connection, attention is directed to the fact that the bearing block is preferably of such size that as the block approaches the limit of its inward movement between the arms of the box, the block will wedge between said arms. Possible vibration will thus be overcome and, as will be seen, the bolts 21 will effectually tie the arms together for sustaining the arms against the wedging action of the block. Further, these bolts will also serve to lock both the bearing block and the adjusting stud 20 upon the box so that even should the nut 22 work off, neither the adjusting stud nor the bearing block can become displaced from the box. I accordingly provide a particularly effective type of bearing for the purpose set forth and a bearing which may, as will be seen, be readily employed in conjunction with the connecting rods of substantially any conventional type of internal combustion engine. Through one of the arms 12 of the box is formed, as particularly shown in Fig. 2, a lubricant passage for conveying lubricant to the bushings 15 and 16 and preferably a lubricant dipper 23 is provided upon the arm at the lower end of said passage. This dipper and passage may be employed in any instance where a splash system of lubrication is used but to provide for the lubrication of the bushings in any instance where a force feed system of lubrication is employed, the other of the arms is provided with an oil cup 24 from which leads a passage 25, so that oil fed from a suitable oil tube will be caught by the cup and thence directed to the bushings. Thus, a connecting rod embodying the present bearing may be readily used upon different types of engines without regard to the particular system of lubrication used in connection therewith.

Having thus described the invention, what is claimed as new is:

1. A bearing including a box, a bearing block carried thereby, means extending freely through the block and slidably connecting the block with the box, and adjusting means for advancing the block held stationary by said first mentioned means.

2. A bearing including a box having spaced arms, a bearing block slidably fitting between said arms, means extending between the arms freely through said block, and adjusting means for advancing the block held stationary by said first mentioned means.

3. A bearing including a box, a bearing block carried thereby, means slidably connecting the block with the box, the block being provided with a recess, and adjusting means for advancing the block received within said recess and engaged by said first mentioned means to be supported thereby stationary with respect to the block.

4. A bearing including a box having spaced arms, a bearing block slidable between said arms and provided with a recess intersected by an elongated opening through the block, fastening means extending between the arms freely through said opening, and an adjusting stud for the block freely received within said recess and having said fastening means extending therethrough for supporting the stud stationary with respect to the block.

5. A bearing including a box, a bearing block slidably supported thereby, adjusting means for the block freely received by the block therein, and means securing the first means stationary upon the box extending freely through the block transversely thereof.

6. A bearing including a box having spaced arms, a bearing block slidably fitting between the arms and having an elongated opening therethrough, means extending transversely between the arms through said opening, and adjusting means for the block held stationary by the first means.

7. A bearing including a box having spaced arms, a bearing block slidable between said arms and provided with a recess, adjusting means for the block freely received in said recess, and means extending transversely between the arms freely through the block and holding the adjusting means stationary.

8. A bearing including a box having spaced arms each provided with angular faces, a bearing block slidable between the arms and provided with angular faces coacting with the angular faces of the arms for holding the block against transverse movement, adjusting means for the block, and means extending transversely between the arms freely through the block and holding the adjusting means stationary.

In testimony whereof I affix my signature.

JOHN W. JAGOE. [L. S.]